United States Patent [19]
Alexander

[11] 3,924,509
[45] Dec. 9, 1975

[54] SELF-PIERCING BLIND FASTENER

[75] Inventor: John Bert Alexander, Hoffman Estates, Ill.

[73] Assignee: Illinois Tool Works Inc., Chicago, Ill.

[22] Filed: Apr. 8, 1974

[21] Appl. No.: 458,636

[52] U.S. Cl. .................... 85/68; 85/84; 85/26
[51] Int. Cl.² ........................... F16B 13/06
[58] Field of Search ............ 85/68, 82, 83, 84, 85, 85/86, 87, 38, 39, 23, 26, 28

[56] References Cited
UNITED STATES PATENTS

| 998,781 | 7/1911 | Kobert | 85/84 |
| 1,746,963 | 2/1930 | Pleister et al. | 85/85 |
| 2,208,779 | 7/1940 | Tinnerman | 85/85 |
| 2,601,803 | 7/1952 | Newman | 85/26 |
| 2,784,636 | 3/1957 | Bohmer | 85/84 |
| 3,188,905 | 6/1965 | Millet | 85/84 |
| 3,208,330 | 9/1965 | Baum et al. | 85/28 |
| 3,276,309 | 10/1966 | Engstrom | 85/85 |

FOREIGN PATENTS OR APPLICATIONS

| 711,095 | 6/1954 | United Kingdom | 85/85 |
| 320,872 | 5/1920 | Germany | 85/84 |
| 628,021 | 11/1961 | Italy | 85/85 |
| 701,524 | 2/1966 | Italy | 85/85 |

Primary Examiner—Marion Parsons, Jr.
Attorney, Agent, or Firm—T. W. Buchman; R. W. Beart

[57] ABSTRACT

A rivet-type fastener assembly capable of being driven and set with a single impact blow. The assembly includes means to allow the entering end to enlarge or separate laterally away from an axial plane of the fastener as a drive pin is forced axially through a bore in the shank. The transverse dimension of the assembly is substantially constant in a plane which is transverse to the axial plane of separation to confine the shank within a nosepiece of a driver until the workpiece has been pierced.

15 Claims, 17 Drawing Figures

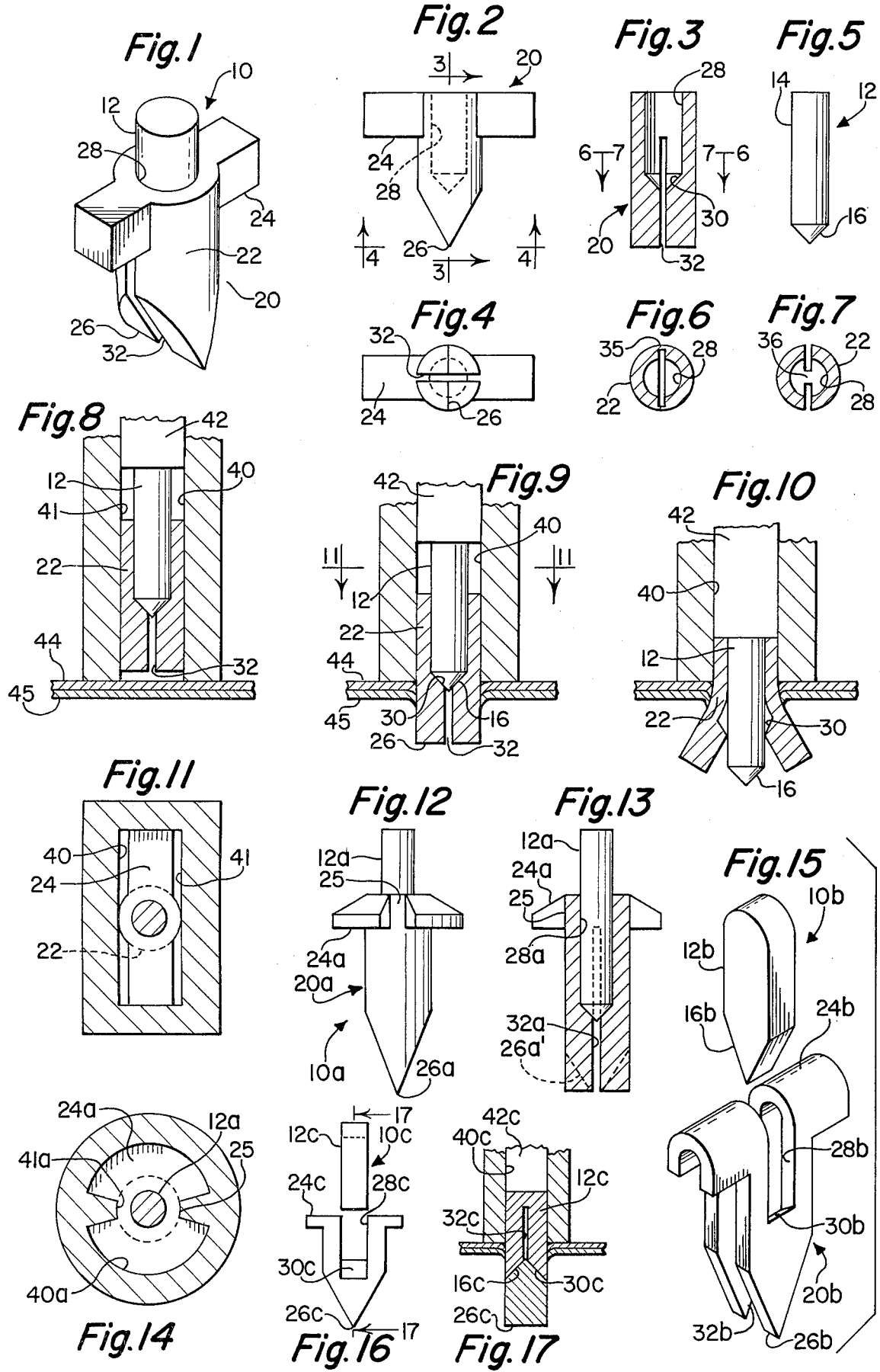

SELF-PIERCING BLIND FASTENER

BACKGROUND OF THE INVENTION

This invention relates generally to fasteners of the type that can be installed from only one side of work material. The invention more particularly relates to such a fastener that is capable of piercing its own hole and expanding behind the workpiece as the result of a single operating stroke.

Blind fasteners are currently utilized to attach a plurality of plates by first drilling or punching a hole in the plates and then inserting a rivet body having a bore and a drive pin situated in the bore. After the rivet body has been positioned through the aperture in the plates, a driving blow is imparted to the drive pin causing the entering end of the rivet body to expand beneath the plates. This practice is obviously time-consuming in that it requires a separate operation to prepare the necessary hole into which the rivet body may be inserted.

Efforts to provide a blind fastener which is capable of piercing a hole in a workpiece and expanding therebeneath in one operating stroke have not met with success. One of the probable reasons for the lack of sucess is the fact that the single impact blow imparted to the drive pin tends to cause the fastener body to prematurely expand, thus reducing the amount of energy available to pierce and, in fact, increasing the piercing area of the entering end of the rivet body.

Existing drive rivet assemblies are not adaptable for use with driving apparatuses designed for high-volume production line attachment techniques. Present drive rivets cannot be utilized in a power driver in which a plurality of such fasteners are fed in succession to a nosepiece chamber for subsequent driving through a workpiece. The prior art fasteners conventionally have a circular head and a concentric shank extending beneath the head. This configuration will not allow proper guidance to be provided the fastener shank as it travels through the nosepiece chamber.

SUMMARY OF THE INVENTION

According to the present invention, a blind rivet assembly includes a drive pin situated within an axial recess in a rivet body. The rivet body includes wing-like stop means at one end and a sharp penetrating point at the other end. The drive pin and recess include cooperating abutment and wedging surfaces which permit the drive pin to transmit a driving force to the body to pierce a workpiece and cause the rivet body to expand when the wing portions abut the workpiece and upon further axial movement of the device pin through the rivet body.

An important aspect of the invention is the capability of the rivet assembly to expand or enlarge laterally from a plane extending axially of the assembly. The rivet body will have a substantially constant cross-sectional dimension transverse this plane so that the shank is confined and restrained from expanding by the walls of the nosepiece as the assembly is driven therethrough.

The structure outlined in the preferred embodiments of the invention also contributes to total guidance of the fastener as it is driven through the nosepiece chamber of the power driver. The shank of the present invention is in sliding contact with the walls of the nosepiece to prevent the fastener shank from cocking or otherwise becoming inclined to the intended axis of penetration.

It is, therefore, an object of the invention to provide a blind fastening device which is capable of piercing the workpiece and expanding behind the workpiece as a result of a single continuous impact blow.

Another object of the invention is the provision of a rivet-type fastener that can guided and confined within the nosepiece of a power driving apparatus.

Still a further object of the invention is the provision of a drive fastener which will pierce the hole in a workpiece and expand behind it utilizing a minimum of driving energy.

These and other objects and advantages of the present invention will become more apparent by reference to the following description of the invention as illustrated in the accompanying drawings.

BRIEF DESCRIPTION OF THE DRAWINGS

FIG. 1 is a perspective view of a preferred embodiment of the drive rivet.

FIG. 2 is a front view of the rivet body shown in FIG. 1.

FIG. 3 is a longitudinal sectional view of the body taken along the lines 3—3 of FIG. 2.

FIG. 4 is a point end view of the body of FIG. 2.

FIG. 5 is a side view of the drive pin used with the body shown in FIGS. 2–4

FIGS. 6 and 7 are sectional views of the body taken along the lines 6/7–7/6 of FIG. 3 and showiing two alternate structures of the side walls of the body.

FIG. 8 is a partial cross-sectional view showing the drive fastener situated in the nosepiece chamber of a driving tool and about to be driven into associated workpieces.

FIG. 9 is a view similar to FIG. 8 showing the drive fastener being driven through the workpieces.

FIG. 10 is a view similar to FIGS. 8 and 9 but showing the fastener being expanded by further axial force of the ram on the drive pin.

FIG. 11 is a cross-sectional view of the nosepiece chamber taken along the lines 11—11 of FIG. 9.

FIG. 12 is a side view of an alternate embodiment of the drive rivet assembly.

FIG. 13 is a partial longitudinal sectional view taken along the lines 13—13 of FIG. 12.

FIG. 14 is a cross-sectional view of the embodiment of FIG. 12 shown confined within the nosepiece chamber in a manner similar to that of FIG. 11 and showing a top plan view of the fastener.

FIG. 15 is an exploded perspective view of another embodiment of the drive rivet assembly.

FIG. 16 is an exploded front view of yet another embodiment of the drive rivet assembly.

FIG. 17 is a partial cross-sectional view of the embodiment shown in FIG. 16 generally along lines 17–17 thereof as it is confined within the nosepiece of a driver and after it has pierced the workpieces.

DESCRIPTION OF THE PREFERRED EMBODIMENT

The invention may be described with reference to the drawings wherein like reference numerals throughout the various views and embodiments are intended to designate similar elements or components.

The drive fastener assembly shown in FIGS. 1–7 includes a body 20 with a generally cylindrical shank portion 22 and a sharp, tapered point 26 at one end and laterally extending wings 24 at the other end. A bore 28 is formed axially of the body terminating short of the point with the bottommost portion of the bore including substantially conical abutment surfaces 30.

A drive pin member 12 is positioned within the bore and is of a cross-sectional configuration corresponding to the cross-sectional configuration of the bore. The entering point 16 of the pin is tapered to a conical configuration complementary to the abutment surfaces 30 in the bore. It will be noted that the overall length of the pin 12 is greater than the axial extent of the bore so that the pin may be driven through the abutment surfaces and cause the body to expand in a manner to be set forth later herein.

The entering end of the shank 22 and the point 26 is provided with a slot 32 which extends generally on a plane including the axis of the fastener. The slot preferably extends upwardly beyond the abutment surfaces 30 of the bore. Thus, when a predetermined driving force is exerted between the point 16 of the drive pin and the abutment surfaces 30 of the body, the body, if unrestrained, will be caused to spread or expand laterally away from the plane provided by the slot 32.

It should be understood that the rivet body 22 may be merely weakened along an axial plane rather than providing the shank with a fully formed slot. Examples of weakening the shank are shown in FIGS. 6 and 7. FIG. 6 shows an embodiment wherein the outer peripheral extent of the body is uninterrupted but an indentation or partial slot portion 35 is provided by reducing the cross section in opposed portions lying on an axial plane. FIG. 7 shows the reverse of the structure of FIG. 6 wherein the shank is weakened by partially slotting the outer periphery of the shank but not completely slotting as in FIG. 4. As in FIG. 6, the weakened portion 36 is along an axial plane.

The invention shown is capable of being driven by impact force on the drive pin with a force sufficient to pierce a workpiece and provide clamping engagement on either side of the workpiece as a result of a single, continuous axial force thereupon. This aspect of the invention is achieved through the novel cooperation of the wings or stop surfaces 24 and the plane of the slot or weakened portion 32. It will be noted, with reference to the drawings, that the wing portion 24 extends primarily in the plane of the slot and provides a maximum and minimum transverse dimension at the trailing extremity of the body.

In the preferred embodiment, the minimum dimension is the diameter of the shank 22 while the maximum dimension is the total lateral extent of the wings 24. In this embodiment, it should be apparent that opposing longitudinal segments of the shank, from the point 26 to the uppermost extremity of the body, are capable of being confined and embraced by walls of a chamber such as the driving chamber of a nosepiece in a power driving device. The importance of this structural arrangement of the invention will become apparent with reference to FIGS. 8–11. A plurality of fastener assemblies 10 may be continuously fed, in consecutive manner, to the nosepiece chamber of a driving tool. A nosepiece chamber, such as chamber 40, may be of a generally rectangular cross-sectional configuration to conform to the substantially rectangular configuration of the wings 24. Since the minimum transverse dimension of the shank 22 is the diameter of the cylindrical body, the side walls 41 of the chamber 40 will contact substantially the entire longitudinal extent of the body and prohibit the body from expanding until the fastener has exited the nosepiece and pierced the workpiece. At that point, the stop wings 24 will abut the upper surface of the workpiece 44. Continued axial force on the drive pin by a ram 42 will cause the pin to be driven through the bore abutment surfaces 30 and expand the shank away from the plane defined by the slot 32. Thus, the rivet assembly will clampingly engage the upper surface of a plate 44 as well as the under surface of a plate 45 by the wings 24 and expanded shank, respectively.

If a rivet body is desired which maximizes the surface contact between the stop means and the upper workpiece or it is desired to provide a rivet body which somewhat resembles the conventional, circular headed fastener, the embodiment shown in FIGS. 12–14 may be utilized.

Assembly 10a is shown to include a generally cylindrical body 20a with a sharp tapered point 26a at the entering end and laterally extending wings 24a in the trailing end. An axially extending slot 32a is provided in the shank and extends upwardly from the entering end thereof. A drive pin 12a is associated within a bore 28a in a manner similar to that of the embodiment shown in FIGS. 1–10. Attention is directed to the configuration of the wings 24a. As shown in FIG. 14, the wings are essentially segments of circles radiating from the uppermost extremity of the cylindrical body and which are spaced circumferentially from one another by gaps 25. These gaps are opposing peripheral segments of the cylindrical body and are shown to lie generally along an axial plane which is perpendicular to the plane of the slot 32a. Thus, in accordance with the basic principles of the invention, the shank may be totally confined and embraced from the point 26a to the uppermost extremity as it is driven through the nosepiece of a power driving device.

FIG. 14 shows show the nosepiece of such a device may be configured with a generally circular cross section and opposing longitudinal splines 41a adapted to be received in the gaps 25. The fastener 10a is thus confined from lateral expansion by the splines. The splines also accurately guide the fastener during its downward descent through the nosepiece.

It will be apparent that the tapered point may intersect the plane of the slot, as 26a shows, or it may be configured to taper toward the plane as shown in the dotted line configuration 26a'. A combination of tapers is within the scope of intent of the invention as well.

FIG. 15 shows yet another embodiment of the invention wherein the fastening device 10b is constructed from a flat sheet material which is blanked and formed by bending over upon itself along a line including the maximum transverse dimension. This procedure thus forms a body 20b which has enlarged lateral wings 24b and a sharp penetrating point 26b. The legs formed thereby are laterally separable from a plane formed along the slot 32b. The bottommost portion of the axially extending recess 28d will include inwardly tapered surfaces 30b, which will cooperate with the pointed portion 16b of the drive pin 12b. The drive pin will have a lateral dimension not exceeding the two thicknesses of material plus the width of the slot so as to not inhibit total confinement of the legs in a plane transverse the plane of the slot.

In yet another embodiment, shown in FIGS. 16 and 17, it will be shown that the expandable element may be the drive pin rather than the rivet body. Assembly 10c shows such an embodiment wherein the drive pin 12c is bifurcated by a slot 32c extending axially thereof. The entering points of the legs on the drive pin will be tapered outwardly from the slot as surfaces 16c. The bottommost portion of the recess 28c will be in the form of a tent-like tapered surface 30c which cooperates with the points of the drive pin in such a manner as to wedge the points laterally away from the slot 32c after the drive pin and rivet body has proceeded through the workpieces. The rivet body will include laterally extending wings 24c forming the maximum dimension while the thickness of the rivet body will form the minimum dimension and allows the laterally spreadable drive pin to be confined until the assembly has pierced the hole and abuts the top surface of the pierced workpiece.

The ability of the fastener constructed in accordance with the invention to be confined and in fact embraced by the side walls of a nosepiece chamber will allow the fastener to be driven with a minimum of driving force. It will be apparent that the impact force from a ram applied directly to a drive pin, in the present invention, will not be utilized to spread the rivet body until the final portion of the power stroke. The early stages of the power stroke may thus be sufficiently utilized to pierce the workpiece since the rivet body is entirely confined from spreading until after the workpiece has been pierced.

While reference has been made to specific embodiments of the invention, various modifications and alterations will become apparent to those skilled in the art in light of the foregoing description. Accordingly, it is intended to embrace all such alternatives, modifications and variations as fall within the spirit and broad scope of the appended claims.

I claim:

1. A self-piercing rivet fastener comprising a rivet body and a drive pin, the rivet body including a shank with an entering end and a trailing end, the entering end including a tapered point, stop surface means extending laterally of the shank at the trailing end thereof, a recess extending axially of the shank from the trailing end and terminating short of the extremity of the entering end, the drive pin and recess including cooperating abutment and wedging surfaces for successively driving and expanding the rivet body as a result of a single driving blow to the drive pin, slot means on the entering end of the shank weakening the shank in a first longitudinal plane extending through the axis of the shank to permit the entering end to expand laterally from the first plane after the entering end extremity has penetrated the workpiece, the trailing portion having a maximum and minimum dimension laterally of the axis of the shank, the maximum dimension incorporated in the stop surface means and being greater than a maximum transverse dimension of the shank, the minimum dimension of the trailing portion extending in a second plane in perpendicular relationship to the first plane, the minimum dimension of the trailing portion being substantially equal to the transverse dimension of the remaining portion of the shank lying in said second plane so that the shank may be supported along substantially its entire length within a driving chamber of an associated fastener driving tool, the drive pin adapted to drive the rivet body through the workpiece and to expand the entering end after the penetration of the entering end through the workpiece.

2. A rivet fastener in accordance with claim 1, wherein the slot means extends axially from the entering end toward the trailing end defining the first plane to allow the shank to expand laterally from the first plane.

3. A rivet fastener in accordance with claim 1, wherein the slot means on the entering end of the shank includes weakened shank portions formed by partial slots along the first plane which permits the shank to fracture along the first plane when the entering end has penetrated the workpiece.

4. A rivet fastener in accordance with claim 1, wherein the bottommost portion of the recess is a substantially conical shaped abutment adapted to receive and transmit driving force from the drive pin, the entering extremity of the drive pin including a substantially conical point for cooperative engagement with the conical abutment surface.

5. A rivet fastener in accordance with claim 1, wherein the clamping means include wing portions extending laterally from limited, spaced circumferential segments of the trailing end of the shank, the lateral extent of said wing portions defining the maximum lateral dimension of the shank.

6. A rivet fastener in accordance with claim 1, wherein the clamping means includes a minimum dimension of circumferentially spaced circular segments, the gaps between the segments lying essentialy on the second plane and forming said minimumdimension allowing opposing splined portions of a nosepiece chamber to pass through the clamping means to confine the shank from expansion until it has penetrated a workpiece.

7. A self-piercing rivet in accordance with claim 1, wherein the entering end of the shank tapers to a sharp point.

8. A rivet in accordance with claim 1, wherein the rivet body is formed from a sheet material and includes a pair of sharp pointed body portions separated from each other by a gap extending along the first plane to the under surface of the clamping means, the minimum dimension of the trailing end being the combined thickness of the two layers of material plus the thickness of the separating gap.

9. A drive rivet assembly capable of penetrating a workpiece and expanding behind the workpiece with a single, continuous, power stroke from a ram in an associated driving tool, the assembly comprising a shank having laterally extending stop means with a maximum and minimum lateral dimension at a trailing extremity and a penetrating point at an entering extremity, a recess extending axially of the shank from the trailing extremity and adapted to receive a drive pin, the drive pin and shank including cooperating abutment and wedging surfaces permitting a driving force to be transmitted through the pin to the shank, to enable the shank to penetrate a workpiece and to expand a portion of the assembly away from a first plane extending through the axis of the fastener after the expandable portion has penetrated a workpiece, the assembly having a cross-sectional dimension in a second plane perpendicular to the first plane, which is substantially constant from the cooperating means to and including the trailing extremity, the minimum lateral dimension of the stop means lying in said second plane of the shank wherein the assembly is confined in the nosepiece of a driver along opposing longitudinal portions of the assembly so that the shank is supported substantially along its entire length within the nosepiece which prevents the expansion of the assembly until the stop means abuts the upper surface of the workpiece.

10. A drive rivet assembly in accordance with claim 9, wherein the drive pin includes a slot extending axially from the entering extremity, on said first plane, toward the trailing extremity and forming a pair of opposing, laterally separable leg portions interconnected at the trailing extremity, the bottommost portion of the recess including wedging surfaces adapted to laterally separate the legs upon the application of axial force to the trailing extremity of the pin, the entering extremity of each leg portion including surfaces tapering outwardly from the slot to facilitate the transmission of driving force to the shank and expansion of the assembly after the entering extremity thereof has penetrated the associated workpiece.

11. A drive rivet assembly in accordance with claim 9, wherein the shank is slotted along the first plane from the entering extremity to at least the cooperating means.

12. A drive rivet assembly in accordance with claim 9, wherein the drive pin is preassembled in the recess, the length of the drive pin being greater than the axial extent of the recess so that a trailing portion of the drive pin extends axially upwardly from the stop means for subsequently driving the entering portion of said pin axially downwardly beyond the cooperating means on the shank.

13. A drive fastener capable of piercing sheet material and clampingly engaging opposing sides as a result of a substantially continuous axial force applied thereto, the fastener comprising a shank with a sharp penetrating point at the entering end thereof and stop means extending laterally of the shank at the trailing end, the shank body being generally cylindrical and including a bore extending axially from the trailing end toward the entering end, a slot extending axially from the penetrating point towards the stop means and defining a first plane and portions of the shank which are laterally separable away from the first plane, a drive pin adapted to be associated within the bore and including an entering extremity with tapered wedging surfaces, the bottommost portion of the bore including tapered abutment surfaces cooperating with the tapered wedging surfaces on the drive pin, said slot extending upwardly at least through the tapered wedging surfaces of the bore, the stop means at the trailing end of the shank having a maximum and minimum transverse dimension with the minimum dimension extending transversely of the shank in a second axially extending plane which is generally perpendicular to said first plane, the minimum dimension being not greater than the diameter of the cylindrical shank body wherein the fastener is guided and supported substantially along its entire length and the laterally separable portions of the body are confined from separation as the fastener is driven by force applied to the drive pin until the stop means abuts on the upper surface of a workpiece.

14. A drive fastener in accordance with claim 13, wherein the stop means includes wing portions extending laterally from opposing peripheral segments of the cylindrical body and lying generally on said first plane, the wing portions thereby defining the maximum transverse dimension of the trailing end.

15. A drive fastener in accordance with claim 13, wherein the stop means is in the form of circumferentially spaced circular segments, the gaps between said segments being opposing circumferential segments of the cylindrical body lying generally on the second axial plane, the opposing circular segments forming the maximum transverse dimension of the trailing end of the shank and the opposing gaps forming the minimum transverse dimension of the trailing end of the shank.

* * * * *